Figure 1:
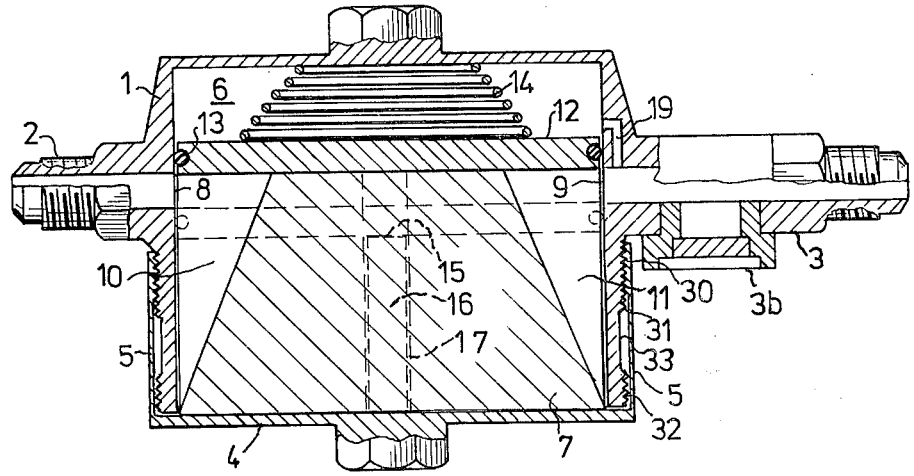

United States Patent

Bengtsson

[11] 3,909,221
[45] Sept. 30, 1975

[54] FILTERING DEVICE
[76] Inventor: Goran Vilhelm Bengtsson, Antenngatan 7, S-421 33 Vastra Frolunda, Sweden
[22] Filed: Feb. 25, 1974
[21] Appl. No.: 445,520

[30] Foreign Application Priority Data
Feb. 28, 1973 Sweden.............................. 7302812

[52] U.S. Cl. ...................... 55/314; 55/275; 55/480; 210/133; 210/234
[51] Int. Cl.[2] ......................................... B01D 46/44
[58] Field of Search ............ 55/309, 312, 314, 478, 55/480, 481, 503, DIG. 17, 313, 275; 210/234, 133, 235, 446, 133; 137/599.1

[56] References Cited
UNITED STATES PATENTS

| 625,131 | 5/1899 | Abbott.................................. 55/481 |
| 658,569 | 9/1900 | Mosher et al......................... 55/480 |
| 2,904,182 | 9/1959 | Baumann.............................. 210/234 |
| 3,330,098 | 7/1967 | Delin ..................................... 55/314 |
| 3,507,391 | 4/1970 | Rosaen .................................. 210/234 |
| 3,715,032 | 2/1973 | Nicko .................................... 210/234 |
| 3,852,196 | 12/1974 | Szdor............................. 210/234 X |

Primary Examiner—Frank W. Lutter
Assistant Examiner—David L. Lacey
Attorney, Agent, or Firm—Allison C. Collard

[57] ABSTRACT

A filter device comprising a housing having a filter element and a removeable cap for allowing replacement of the filter element. A valve means is provided in the housing, said valve means having a valve body which, in a first position, allows a medium flow from the inlet to the outlet of the housing via the filter. Upon removal of the filter element, the valve body is automatically moved to a second position in which it establishes a by-pass passageway to allow a medium flow from the inlet to the outlet past the filter.

1 Claim, 2 Drawing Figures

U.S. Patent  Sept. 30, 1975  3,909,221

FILTERING DEVICE

The present invention relates to a filtering arrangement, for example a drying filter arrangement for refrigerants in a cooling system, comprising a housing provided with an inlet and an outlet, said housing having a filter-containing space having a sealable opening in order to replace the filter contained therein and a valve having a valve body which, in a first position, allows medium flow from the inlet to the outlet via the filter-containing space and which, in a second position, allows medium flow from the inlet to the outlet past the filter-containing space.

It is previously known by, for example, Swedish Pat. specification 177,273, to provide a filtering arrangement with a valve through which it is possible to close the passage through the filter and open a by-pass conduit so that the filter can be replaced without disturbing the function of the cooling system. The known arrangement has a T-shaped coupling having an inlet stud, an outlet stud and an intermediate connecting stud for a filter container. Inside the coupling, in the extension of the connecting stud, a moveably arranged valve body is connected to a threaded spindle which projects out of the coupling. By turning the spindle, the valve body is moved to either of its two positions. A disadvantage with this known arrangement is that it is complicated and expensive and demands extra manipulation during replacement of the filter.

The purpose of the present invention is to avoid the above mentioned disadvantages and obtain a filtering arrangement of the type disclosed in the introduction, and which is simple and inexpensive in construction and, furthermore, which automatically closes the passage through the filter and opens the by-pass conduit during replacement of the filter. This is obtained according to the present invention by means of the valve body being so arranged in relation to the filter-containing space that, when a filter is in place, said valve body is held in said first position under the influence of the filter or means cooperating with said filter and that, during replacement of the filter, said valve body is moved to said second position by means of spring action.

Figure 2:
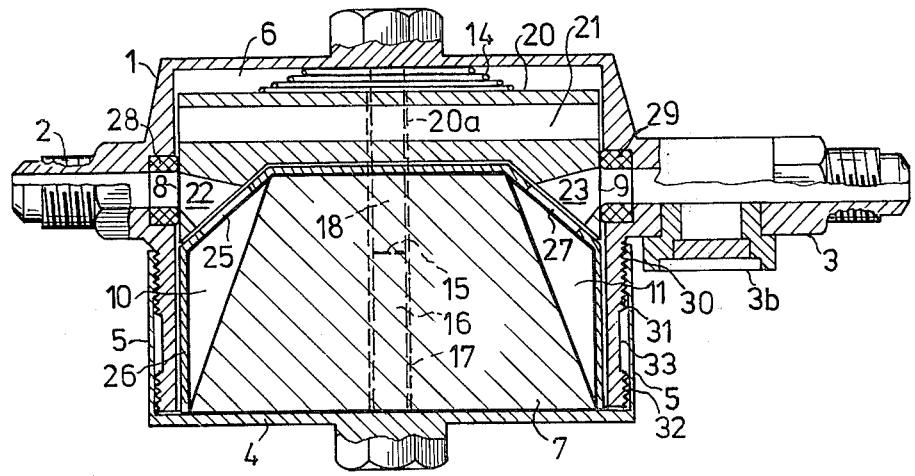

The invention is described in more detail with reference to the accompanying drawing showing embodiments in which FIG. 1 shows a cross section through an embodiment of the arrangement according to the invention in an operating position and FIG. 2 shows a cross section corresponding to FIG. 1 of a second embodiment of the invention.

The filter arrangement has a cylindrical housing 1 having an inlet stud 2 and an outlet stud 3 having a sight glass 3b comprising a moisture indicator. The housing 1 is open at the bottom and is sealed by a cap 4 which, with an inwardly threaded portion 5, engages with corresponding threads on the outer surface of the housing. In the formed space 6 a filter 7 of, for instance, silica gel is inserted which, between the respective openings 8 and 9 of the inlet and outlet studs 2 and 3, respectively, in the space 6, is provided with recesses 10 and 11 in order to allow the inflowing medium to also flow through the bottom portion of the filter.

In FIG. 1 the filter arrangement according to the invention is shown in its simplest form. A thin piston 12 is arranged above the filter 7 in the space 6, said piston forming a moveable wall which divides the space 6 into two parts. The piston 12 has an O-ring gasket 13 in a groove on its peripheral surface, said O-ring gasket 13 forming a seal against the side wall of the space 6. By means of a conical coil spring 14, the piston 12 is loaded in a direction towards the filter 7. In FIG. 1 the piston 12 is shown by solid lines in its position of operation in which it lies in contact directly with the filter 7. Inflowing medium now flows through the filter 7 and out through the outlet stud 3. When the filter 7 shall be replaced, the cap 4 is screwed off from the housing 1. The piston 12 is herewith moved downwards by means of the coil spring 14 and, before the cap 4 is completely screwed off of the housing, the piston 12 lies against a stop which is formed by the upper surface 15 of two or more ribs 16 which are formed on the inner wall of the housing. Corresponding recesses 17 are arranged in the filter, said recesses 17 serving as guides and ensuring that the recesses 10, 11 are positioned in front of the inlet 2 and the outlet 3, respectively, when a new filter 7 is being inserted. In the piston's position which is shown by the dashed lines, the upper surface of the piston 12 lies even with the bottom edges of the openings 8 and 9 and the medium now flows directly from the inlet 2 to the outlet 3 through that portion of the space 6 which lies above the piston 12 while the piston forms a seal against the open end of said space 6. When the filter has been inserted, the whole above-described process takes place in reverse and the position of operation shown by the solid lines is automatically obtained when the cap is screwed on. A narrow overflow channel 19 ensures herewith that the medium above the piston 12, during the upward movement of the piston 12, can flow to the outlet 3 so that no unallowably high pressure arises above the piston which would be able to affect the upward movement of the piston in a negative manner.

Another embodiment of the invention is shown in FIG. 2, whereby parts corresponding to those in FIG. 1 have maintained their reference numerals. The shown filtering arrangement differs from the one according to FIG. 1 mainly as regards the shape of the piston. Said piston, referred to as 20, has a larger axial extension than the piston 12 and is provided with a cross-bore 21 and an inlet and outlet bore 22 and 23, the latter bores extending from the peripheral surface of the piston and opening into the cup-shaped bottom of the piston. In the shown operation position the medium flows from the inlet 2 to the outlet 3 via bore 22, a bore 25 in a filter casing 26, the filter 7, a bore 27 in the filter casing 26 and the bore 23.

When the cap 4 is screwed off of the housing in order to replace the filter 7, the piston 20 is moved downwards until it comes into contact with the surface 15 on the ribs 16 which have extensions 18 which have a smaller radial width which engage in corresponding grooves 20a in the piston 20 and serve as guides for the same. In this position the cross-bore 21 is positioned in front of the openings 8 and 9 and forms direct contact between the inlet 2 and outlet 3. The seals 28 and 29 ensure that leakage is kept at a minimum.

As can be seen by the figures, the portion 5 of the cap 4 and the threads on the housing 1 are longer than the travel of the pistons 12 and 20, respectively. This is to ensure that, under normal operation conditions, the cap 4 cannot be loosened (unscrewed) before the by-pass conduit is established and the pressure in the portion of the space 6, which is below the pistons, has been reduced by means of the normal leakage between the threads when the cap is loosened. As a further safety precaution, the portion 5 of the cap 4 can, as shown in FIG. 2, have threads 30 only in its upper portion and the threads of the housing 1 can be divided into an upper and lower thread 31 and 32 having an intermediate groove 33, the width of which exceeds the width of the thread 30. The upper thread 31 of the housing 1 is somewhat longer than the travel of the piston 20. By means of this arrangement it is possible, when the thread 30 of the cap reaches the groove 33, to feel if the piston 20 has been moved to the lower end position and the lower thread 32 serves then as a plug if the piston 20 remains in the operation position, for example, because of an excessive pressure in the system which absorbs the force in the spring 14.

The respective threads have little pitch so that a great force is obtained and a relatively small torque is required during the screwing on of the cap 4 in order to move the pistons 12 and 20, respectively, to the position of operation against the spring force which must be relatively great in order to work against the upwardly directed pressure on the piston from the flowing medium during operation. In the embodiment according to FIG. 2, a load-releasing of the filter 7 itself is obtained with the help of the filter casing 26 which also provides a low friction by means of the fact that the bottom of the cap 4, during screwing on, will only press against the narrow bottom edge of the casing 26. In lower forces and depending on the filter material, the filter casing 26 can be left out entirely as in the embodiment according to FIG. 1.

The filtering arrangement according to the invention is, of course, not restricted to filtering of refrigerants in cooling systems but can be used in all connections where there is a need to quickly and easily replace filters. Other areas of use are pressure air systems for moisture separation, water circulation systems and hydraulic systems for dirt separation, etc.

What I claim is:

1. A filter device comprising:

a filter element;

a hollow cylindrical housing having inlet and outlet openings and a channel between the openings receiving said filter element;

a piston displaceable in said housing, said piston including two passages extending inwardly from its peripheral surface for establishing communication between the inlet and outlet openings through the filter element channel;

a cap for sealing the channel of the housing and for permitting removal and replacement of the filter element; and spring means disposed in said housing and urging said piston in a direction towards the filter element;

so that when the filter element is removed by removing said cap from the channel of said housing, said spring will displace said piston to prevent the inlet and outlet openings from being in flow communication with the channel;

said piston being provided with a cross bore situated at an axial distance from said inlet and outlet openings when the filter is in said channel, said cross bore establishing direct communication between the inlet and the outlet upon removal of the filter element.

* * * * *